Patented July 25, 1933

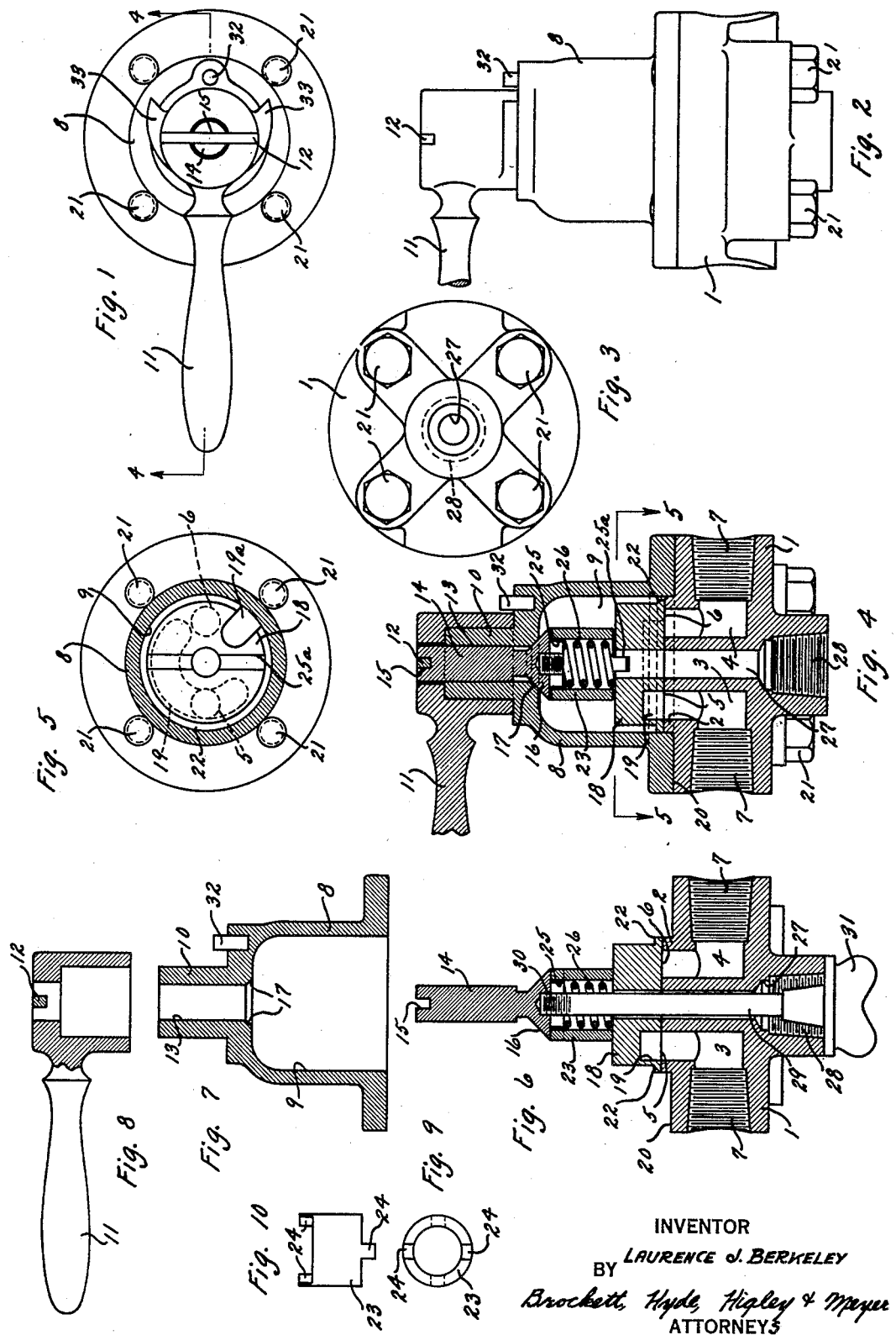

1,919,973

UNITED STATES PATENT OFFICE

LAURENCE J. BERKELEY, OF CLEVELAND, OHIO

VALVE MECHANISM

Application filed April 14, 1930. Serial No. 444,115.

This invention relates to valve mechanisms such as are used for controlling the flow of fluids, including water, steam, compressed air or other gases, or indeed, any fluid medium.

The objects of the present invention are generally to improve the valve construction and more particularly to provide a simple and improved arrangement which permits accurate grinding or surfacing of the relatively rotatable seat parts and insures and maintains close and accurate contact between them without leakage during operation; to provide a simple and improved driving connection between the rotatable valve member and its driver by which the valve is self-accommodating to its seat and is maintained in proper working relation therewith; and finally, to provide an improved valve arrangement with the parts fitted to receive a pilot for convenient assembly of the valve parts during manufacture.

Other objects of the invention are in part obvious and in part will appear more in detail hereinafter.

In the drawing, which represents one suitable embodiment of the invention, Fig. 1 is a plan view; Fig. 2 is a side elevation; Fig. 3 is a bottom view; Fig. 4 is a sectional elevation on the line 4—4, Fig. 1; Fig. 5 is a sectional plan view on the line 5—5, Fig. 4; Fig. 6 is a detail sectional view, corresponding to Fig. 4 and illustrating use of the assembling pilot; Figs. 7 and 8 are corresponding sectional views of the casing and handle respectively; Fig. 9 is a bottom plan view of the coupling; and Fig. 10 is a side elevation thereof.

The valve shown in the drawing comprises a suitable body member or base 1, which may be a casting suitably cored out and machined to provide any necessary or suitable ports and passages therein. It may be of any suitable shape, such as square, hexagonal, or the like, but is shown as generally round in plan view, with its upper face flat except for a shallow upwardly projecting boss 2, Fig. 6, of circular form and the upper surface of which forms the valve seat. Said body may have any suitable number of ports and passages, according to the particular use for which it is designed, but in the arrangement shown is provided with two passages 3, 4 communicating with ports 5, 6 in the valve seat, said passages being suitably fitted for connection to conduits or the like, such as by provision of the threads at 7. Upon the body is mounted a shell or casing 8, of hollow form, provided with an inner chamber 9, the upper portion of said shell having an upwardly extending cylindrical boss 10 which forms a bearing around which turns the operating handle 11 provided with a driving cross bar 12, in the particular form shown. Said upward extension is provided with a through opening 13 in which rotates the valve driver 14 of shaft form provided at its upper end with a cross or screw driver slot 15 to receive the driving bar 12, and at its lower end having a tapered or conical portion 16, the conical surface of which is ground to fit a corresponding seat at 17 in the valve shell, for the purpose of preventing leakage of fluid pressure to the outside of the casing through the driver connection. The valve member is shown at 18. It is of disc form with a flat lower ground surface resting upon and accurately fitting the valve seat of the body. In the particular arrangement shown, said valve member is provided on its under surface with a passage 19 extending about half way around the periphery and adapted in one position of the valve to establish communication between ports 5 and 6 of the valve body. It is also provided with a through slot 19a adapted to be moved into registration with either of the ports 5, 6 to establish communication from the chamber 9 to either of the passages 3 and 4.

Said valve member is suitably arranged to be more or less self-accommodating to its seat so as to maintain a close fit and seal therewith regardless of matters of alinement and tightness of assembly of the casing parts. Said casing parts meet along the surfaces 20 where a gasket is usually inserted, and they are held together by the clamping bolts 21. Unevenness in the gasket or varying degrees of screwing up the clamping bolts in some cases produces misalinement between the body and shell parts. Therefore, the disc-like valve member has its upper portion reduced to leave, adjacent the valve seat surface, a relatively thin outwardly extending flange 22 which is a fairly close fit within the cylindrical chamber 9 but with a slight clearance, say 1/64 or 1/32 of an inch between the outer edge of said flange and the casing wall. The wall, therefore, forms a guide to confine the valve to rotary motion upon its seat but permits all necessary cocking or askew position of the valve as the result of inaccuracies of workmanship or lack of alinement.

The driving connection between the driver 14 and valve member 18 is both yielding and of universal joint form and any suitable arrangement may be used for either or both of these results. In the form shown, the driving connection is accomplished by an intermediate connector 23, Figs. 9 and 10, which is a short section of tubing milled or cut out at both ends to provide at each end a pair of driving teats or projections 24, those at one end being in staggered or intermediate relation with those at the other end. Each pair of driving projections on said tube enters a slot, one slot marked 25 being in the depending head of the driver 14 and the other slot marked 25a being in the valve member 18. Also, the main body portion of the sleeve 23 is made slightly shorter than the distance between the valve 18 and driver 14 when the parts are in use, so that the slight endwise clearance thus provided permits askew valve movement for self-accommodation thereof to its seat, if necessary. Within the sleeve 23 is housed a light compression spring 26.

For ease of assembling the parts in the course of manufacture of these valves, the valve body 1 and valve member 18 are preferably provided with a through opening or passage 27 located at the valve axis and in alinement with the axis of the driver 14. This passage may be provided solely for assembling purposes, in which case it may be plugged at its outer end, but the same passage may also be resorted to as a flow passage for the fluid which the valve controls. The latter arrangement is shown in the drawing, said passage 27 being threaded at its outer end for connection to the source of supply.

In assembling the valve a suitable pilot 29 threaded at one end, as at 30, and provided with driving means, such as the winged head 31 at its opposite end, is threaded through the passage 27 in the valve body and valve member 18 respectively, as in Fig. 6. The cooperating seat surfaces of both the valve body and valve member may be separately ground to accurate flat form before assembling. The connector 23 is then applied to the pilot and a spring 26 is laid in place within it. The driver 14 is next applied and the pilot 29 is screwed into it with the tongues 24 of the connector properly nested in the crossed slots of the valve member and driver respectively. The pilot is then screwed up tight until the parts occupy the position shown in Fig. 6, with all parts tightly and immovably connected together. The valve casing is next laid in place and is attached to the body by means of the clamping bolts 21, after which the handle is applied. The pilot 29 may now be withdrawn and the valve is ready for attachment to the parts which it is designed to control. In the arrangement shown, with the valve parts in the position shown in Fig. 5, which is the lap position, fluid pressure from the source flows through the channel or passage 27 to the valve chamber 9 and is there trapped, its escape being prevented by the effect of the pressure on both the valve member 18 and the driver 14, each of which is held to its seat not only by the pressure of the source but also by the pressure of the spring 26. Rotation of the valve member in the clockwise direction, Fig. 5, brings the port 19 into communication with port 6 and permits pressure to flow from the source to the passage 4 and thence to any suitable container; for example, the ports 19 and 6 are curved where they crack so that minute or very slow flow may be secured, and by returning the valve handle to initial position, the parts may be lapped and pressure maintained in the reservoir. By rotating the valve handle in the clockwise direction, Fig. 5, until the passage 19 overlaps both of ports 5 and 6, the pressure admitted to the reservoir may be permitted to discharge by way of passage 4, port 6, passage 19, port 5, and passage 3 to any desired place.

What I claim is:

1. Valve mechanism, comprising a valve body and housing having a chamber therein, said valve body being provided with a seat surface, a valve member mounted to seat and rotate upon said surface, said valve body and member being provided with alined through openings, a driver extending through the housing and alined with said openings and provided with attaching means, and a tubular connector between said driver and valve member having its bore also alined with said opening, whereby a pilot member may be introduced through the alined openings of said body, valve member and tubular connector and attached to said driver.

2. Valve mechanism, comprising a valve body and housing having a chamber therein, said valve body being provided with a seat surface, a valve member mounted to seat and rotate upon said surface, said valve body and member being provided with alined through openings, a driver extending through the housing and alined with said openings and provided with attaching means, a tubular connector between said driver and valve member having its bore also alined with said opening, whereby a pilot member may be introduced through the alined openings of said body, valve member and tubular connector and attached to said driver, and a spiral spring within said tubular connector for holding said valve member to its seat.

3. Valve mechanism, comprising a valve body provided with a valve seat, a valve member mounted to rotate upon said seat, a driver for rotating said member, a tubular connector having driving teats at one end engaging in lateral recesses in said valve member to permit lateral movement and teats at the opposite end engaging in lateral recesses provided in said driver to permit lateral movement of said driver relative to said connector, and a spring housed within said tubular connector for holding said valve member to its seat.

4. Valve mechanism, comprising a valve body provided with a valve seat, a valve member mounted to rotate upon said seat, a driver for rotating said member, a tubular connector having driving teats at one end engaging in lateral recesses in said valve member to permit lateral movement of said member in one direction relative to said connector, and teats at the opposite end engaging in lateral recesses provided in said driver and disposed at right angles to the first mentioned teats to permit lateral movement of said driver relative to said connector in a direction at right angles to the first mentioned direction.

LAURENCE J. BERKELEY.